Oct. 25, 1966   H. O. SCHERENBERG   3,280,801
ROTARY PISTON ENGINE
Filed June 29, 1964
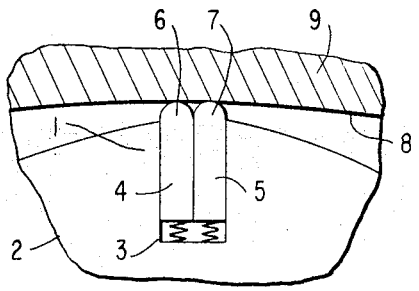
FIG.1
FIG.2
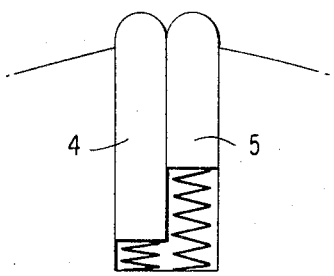
FIG.3
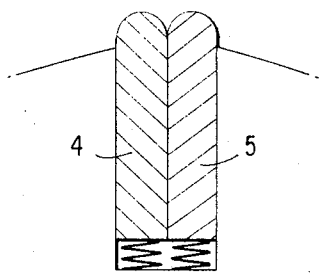
FIG.4
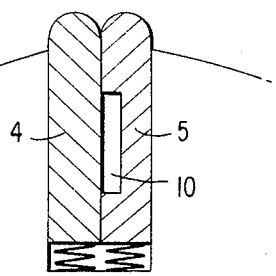
FIG.5
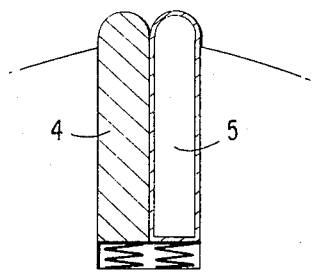
INVENTOR.
HANS O. SCHERENBERG
BY *Dicke + Pinig*
ATTORNEYS

United States Patent Office 3,280,801
Patented Oct. 25, 1966

3,280,801
ROTARY PISTON ENGINE
Hans O. Scherenberg, Stuttgart-Heumaden, Germany, assignor to Daimler-Benz Aktiengesellschaft, Unterturkheim, Germany
Filed June 29, 1964, Ser. No. 378,514
Claims priority, application Germany, July 4, 1963,
D 41,899
10 Claims. (Cl. 123—8)

The present invention relates to a rotary piston internal combustion engine, and more particularly to a radial seal construction for rotary piston internal combustion engines with two vane-like sealing bars or strips arranged one behind the other in the circumferential direction within a respective groove of the piston extending parallel to the axis thereof.

The present invention aims at achieving for such so-called strips or double bars a damping of the movement by simple means in order that the periodic wear marks, the so-called rattle marks, which are produced by the oscillating or flutter movements of the sealing bars or strips at the inner surfaces of the housing of the engine, no longer occur.

In solution of the underlying problem the present invention essentially consists in that the one vane-like sealing strip or bar has a smaller mass than the other vane-like sealing strip or bar. Since the natural frequency of a sealing strip or bar together with the spring thereof is dependent on the mass of this sealing strip or bar, each of the two sealing strips or bars having differing masses, also possesses its own natural frequency. Since the sealing strips or bars are furthermore disposed one behind the other and in contact with each other, a damping of the movements of the two sealing strips or bars is achieved by the frictional forces exerted during movement of sealing strips relative to one another.

According to a further feature of the present invention one of the sealing strips or bars may have a smaller dimension than the other sealing strip or bar so that under the assumption of identical material a smaller mass results for the sealing strip with the smaller dimensions and a larger mass for the sealing strips with the larger dimensions.

With preferably identical dimensions of both sealing strips or bars, the one sealing strip, however, may also have a smaller specific weight than the other sealing strip. Thus, for example, the one sealing strip may consist in the usual manner of steel whereas the other sealing strip may be made of light metal.

A differing distribution of the masses may, however, also be achieved by the fact that with preferably identical dimensions of both sealing strips one sealing strip is provided with recesses, bores or the like as compared to the other.

Furthermore, with preferably identical dimensions of both sealing strips, one sealing strip may be constructed as hollow body in contrast to the other so that the one sealing strip is accordingly made of solid material and the other sealing strip only of sheet metal.

Accordingly, it is an object of the present invention to provide a radial seal for rotary piston internal combustion engines which eliminates by extremely simple means the drawbacks encountered with the prior art constructions.

Another object of the present invention resides in the provision of a radial seal for rotary piston internal combustion engines in which the effectiveness of the seal as well as the length of life thereof is significantly increased by reducing the wear at the internal housing surfaces along which slide the radial seals.

A further object of the present invention resides in the provision of a radial seal for rotary piston internal combustion engines which consists of at least two vane-like sealing strips or bars disposed one behind the other and which produces an effective damping in the radial movements of the sealing strips or bars without requiring any additional mechanical means.

Another object of the present invention resides in the provision of a radial seal for rotary piston internal combustion engines of trochoidal construction in which the individual sealing bars accommodated in a respective axial groove provided at the piston corners are so constructed relative to one another that the natural resonance frequencies thereof differ from one another to such an extent that the mutual contact in effect causes a damping action.

These and other objects, features and advantages of the present invention will become more obvious from the following description when taken in connection with the accompanying drawing which shows, for purposes of illustration only, several embodiments in accordance with the present invention, wherein—

FIGURE 1 is a partial transverse cross sectional view through a rotary piston internal combustion engine of trochoidal construction and illustrating a first embodiment of a radial seal in accordance with the present invention, and FIGURES 2, 3, 4, and 5 are partial cross sectional views, similar to FIGURE 1, of four further modified embodiments of radial seals in accordance with the present invention.

Referring now to the drawing wherein like reference numerals are used throughout the various views to designate like parts, and more particularly to FIGURE 1, there are arranged in this figure at the corner 1 of the piston 2 of a rotary piston internal combustion engine within the groove 3 extending parallel to the axis of the engine, the two vane-like sealing strips or bars 4 and 5, disposed one behind the other in the circumferential direction of the piston in such a manner that they are movable in the radial direction within the groove 3 and slide with the sealing edges 6 and 7 thereof along the inner surfaces 8 of the housing 9 of the rotary piston internal combustion engine. Springs of conventional construction are arranged underneath the sealing bars or strips 4 and 5 which press the sealing strips or bars 4 and 5 in the radially outward direction.

In order to avoid the periodic wear appearances at the internal surfaces 8 of the housing 9, which are produced by oscillatory or flutter movements of the sealing strips 4 and 5, the sealing strip or bar 4 has a relatively large mass and the sealing strip or bar 5 a relatively small mass. By reason of this differing mass distribution, relative movements are produced between the two sealing strips or bars 4 and 5 and the friction produced thereby at the contact surfaces of the two sealing strips has a damping effect on the movements of the sealing strips 4 and 5.

In the embodiment according to FIGURE 2, the sealing strip or bar 4 again has the larger mass and the sealing strip or bar 5 the smaller mass. Both sealing strips consist of the same material. The differing distribution of the masses is produced by the fact that the sealing strip or bar 5 is shorter than the sealing strip or bar 4.

The embodiments according to FIGURES 3–5 are recommended, if one desires to maintain the same dimensions for both sealing strips or bars 4 and 5. In FIGURE 3 the sealing strip or bar 4 which is to have the larger mass, has a larger specific weight. For example, the sealing strip 4 is made of steel. In contrast thereto, the sealing strip or bar 5, which is to have the smaller mass, has a smaller specific weight. The sealing strip 5 is made, for example, of aluminum. Possibly the sealing edge of the sealing strip 5 may be reinforced or covered with a harder metal in order to achieve more favorable running characteristics.

In the case of the embodiment of FIGURE 4, both sealing strips or bars 4 and 5 have the same dimensions and consist of the same material. However, whereas the sealing strip or bar 4 having the larger mass has a solid material cross section, the sealing strip or bar 5 with the smaller mass is provided with one or several apertures or recesses 10.

In connection with the sealing strips or bars 4 and 5 according to FIGURE 5, the sealing strip 4 having the larger mass is made of solid material and the sealing strip 5 having the smaller mass is constructed as hollow body and has walls made of sheet metal.

While I have shown and described several embodiments in accordance with the present invention, it is understood that the same is not limited thereto but is susceptible of numerous changes and modifications as known to a person skilled in the art. For example, the various arrangements of the different embodiment described in connection with FIGURES 1 and 5 may be combined in any suitable manner, for instance, by providing two sealing bars or strips having different masses as a result of several or all of the measures or any combination thereof disclosed herein.

Thus, while I have shown and described only five embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A radial seal for rotary piston internal combustion engines, comprising:
 housing means provided with internal surface means,
 rotary piston means rotatably supported within said housing means,
 said piston means being provided with groove means extending substantially parallel to the axis of the engine,
 and two vane-like sealing strip means arranged in each groove means which are disposed one piece behind the other, in the circumferential direction,
 one of said sealing strip means of the two sealing strip means in a respective groove means having a smaller mass than the other.

2. A radial seal for rotary piston internal combustion engines, comprising:
 housing means provided with internal surface means,
 rotary piston means rotatably supported within said housing means,
 said piston means being provided with groove means extending substantially parallel to the axis of the engine,
 and two vane-like sealing strip means arranged in each groove means which are disposed one piece behind the other, in the circumferential direction,
 one of said sealing strip means of the two sealing strip means in a respective groove means having a smaller mass than the other,
 said one sealing strip means having a smaller dimension than the respective other sealing strip means.

3. A radial seal for rotary piston internal combustion engines, comprising:
 housing means provided with internal surface means,
 rotary piston means rotatably supported within said housing means,
 said piston means being provided with groove means extending substantially parallel to the axis of the engine,
 and two vane-like sealing strip means arranged in each groove means which are disposed one piece behind the other, in the circumferential direction,
 one of said sealing strip means of the two sealing strip means in a respective groove means having a smaller mass than the other,
 the two sealing strip means in a respective groove means having approximately identical dimensions,
 one of the sealing strip means having a smaller specific weight than the other sealing strip means.

4. A radial seal for rotary piston internal combustion engines, comprising:
 housing means provided with internal surface means,
 rotary piston means rotatably supported within said housing means,
 said piston means being provided with groove means extending substantially parallel to the axis of the engine,
 and two vane-like sealing strip means arranged in each groove means which are disposed one piece behind the other, in the circumferential direction,
 one of said sealing strip means of the two sealing strip means in a respective groove means having a smaller mass than the other,
 the two sealing strip means in a respective groove means having approximately identical dimensions,
 one of said sealing strip means being provided with aperture means as compared to the other sealing strip means.

5. A radial seal for rotary piston internal combustion engines, comprising:
 housing means provided with internal surface means,
 rotary piston means rotatably supported within said housing means,
 said piston means being provided with groove means extending substantially parallel to the axis of the engine,
 and two vane-like sealing strip means arranged in each groove means which are disposed one piece behind the other, in the circumferential direction,
 one of said sealing strip means of the two sealing strip means in a respective groove means having a smaller mass than the other,
 the two sealing strip means in a respective groove means having approximately identical dimensions,
 one of said sealing strip means being constructed as hollow body compared to the other sealing strip means.

6. In a rotary piston internal combustion engine of trochoidal construction which includes a housing having internal surfaces, a polygonal piston rotatably supported within said housing, said piston being provided with a groove extending parallel to the axis of the engine at each piston corner, and radial seal means in each groove including two vane-like sealing bars disposed one behind the other in each groove and sliding with the radial outer surfaces thereof along the internal surfaces of the housing the improvement essentially consisting of means for damping the radial movements of the sealing bars in a respective groove, said means being effectively constituted by sealing bars having different masses and therewith different natural resonant frequencies 7. In a rotary piston internal combustion engine o trochoidal construction which includes a housing having internal surfaces, a polygonal piston rotatably supported within said housing, said piston being provided with a groove extending parallel to the axis of the engine at each piston corner, and radial seal means in each groove including two vane-like sealing bars disposed one behind the other in each groove and sliding with the radial outer surfaces thereof along the internal surfaces of the housing, the improvement essentially consisting of means for damping the radial movements of the sealing bars i a respective groove, said means being effectively constituted by sealing bars having different masses an therewith different natural resonant frequencies, the different masses being realized by differing dimensions of a respective pair of sealing bars.

8. In a rotary piston internal combustion engine of trochoidal construction which includes a housing having internal surfaces, a polygonal piston rotatably supported within said housing, said piston being provided with a groove extending parallel to the axis of the engine at each piston corner, and radial seal means in each groove including two vane-like sealing bars disposed one behind the other in each groove and sliding with the radial outer surfaces thereof along the internal surfaces of the housing, the improvement essentially consisting of means for damping the radial movements of the sealing bars in a respective groove, said means being effectively constituted by sealing bars having different masses and therewith different natural resonant frequencies, one sealing bar having a different specific weight from the other sealing bar.

9. In a rotary piston internal combustion engine of trochoidal construction which includes a housing having internal surfaces, a polygonal piston rotatably supported within said housing, said piston being provided with a groove extending parallel to the axis of the engine at each piston corner, and radial seal means in each groove including two vane-like sealing bars disposed one behind the other in each groove and sliding with the radial outer surfaces thereof along the internal surfaces of the housing, the improvement essentially consisting of means for damping the radial movements of the sealing bars in a respective groove, said means being effectively constituted by sealing bars having different masses and therewith different natural resonant frequencies, one sealing bar being provided with aperture means compared to the other sealing bar.

10. In a rotary piston internal combustion engine of trochoidal construction which includes a housing having internal surfaces, a polygonal piston rotatably supported within said housing, said piston being provided with a groove extending parallel to the axis of the engine at each piston corner, and radial seal means in each groove including two vane-like sealing bars disposed one behind the other in each groove and sliding with the radial outer surfaces thereof along the internal surfaces of the housing, the improvement essentially consisting of means for damping the radial movements of the sealing bars in a respective groove, said means being effectively constituted by sealing bars having different masses and therewith different natural resonant frequencies, one sealing bar being constructed as hollow body while the other sealing bar is made of solid material.

No references cited.

MARK NEWMAN, *Primary Examiner.*

F. T. SADLER, *Assistant Examiner.*